United States Patent [19]
Pasch et al.

[11] Patent Number: 5,500,271
[45] Date of Patent: Mar. 19, 1996

[54] PAINT ARRESTOR FORMED FROM SLIT SHEET MATERIAL

[75] Inventors: Roger M. Pasch, Windsor; Kenneth C. Langenecker, Fall River, both of Wis.

[73] Assignee: Research Products Corporation, Madison, Wis.

[21] Appl. No.: 287,656

[22] Filed: Aug. 9, 1994

[51] Int. Cl.$^6$ .............................. B01D 39/12; B32B 3/24
[52] U.S. Cl. .................. 428/135; 428/136; 428/137; 55/482; 55/486; 55/487; 55/488; 55/489; 55/491; 55/444; 55/445; 55/500; 55/521; 55/522; 55/525
[58] Field of Search .................................. 428/135, 136, 428/137; 55/482, 486, 487, 488, 489, 491, 444, 445, 500, 521, 522, 525

[56] References Cited

U.S. PATENT DOCUMENTS

| | | | |
|---|---|---|---|
| 1,895,642 | 1/1933 | Preble | 55/525 |
| 2,037,164 | 4/1936 | Harrah | 55/525 |
| 2,319,225 | 5/1943 | Grebe et al. | 428/136 |
| 2,493,726 | 1/1950 | O'Day | 55/525 |
| 2,558,185 | 6/1951 | Leisen | 55/525 |
| 2,602,521 | 7/1952 | Smith | 55/487 |
| 2,989,145 | 6/1961 | Goodloe | 55/525 |
| 3,744,222 | 7/1973 | Delao | 55/445 |
| 3,825,465 | 7/1974 | Stock | 428/135 |
| 3,909,224 | 9/1975 | Spencer | 156/197 |
| 3,949,651 | 4/1976 | Spencer | 156/197 |
| 4,105,724 | 8/1978 | Talbot | 428/135 |
| 4,133,255 | 1/1979 | Guice | 118/326 |
| 4,501,707 | 2/1985 | Buhlmann | 55/525 |
| 4,530,274 | 7/1985 | Lyons et al. | 98/115.2 |
| 4,693,048 | 9/1987 | Guetersloh | 52/664 |
| 5,192,602 | 3/1993 | Spencer et al. | 428/179 |
| 5,207,020 | 5/1993 | Aslam et al. | 47/9 |
| 5,252,111 | 10/1993 | Spencer et al. | 55/489 |
| 5,273,563 | 12/1993 | Pasch et al. | 55/493 |

*Primary Examiner*—William P. Watkins, III
*Attorney, Agent, or Firm*—Andrus, Sceales, Starke & Sawall

[57] ABSTRACT

A paint arrestor for absorbing paint overspray comprises a series of layers of sheet material, each of the layers being slit and expanded to define an array of air spaces distributed in columns. The air spaces alternate in size from column to column and repeat in size in every other column. Means are provided for securing the layers in contiguous, overlying relationship with one another.

14 Claims, 3 Drawing Sheets

U.S. Patent    Mar. 19, 1996    Sheet 1 of 3    5,500,271
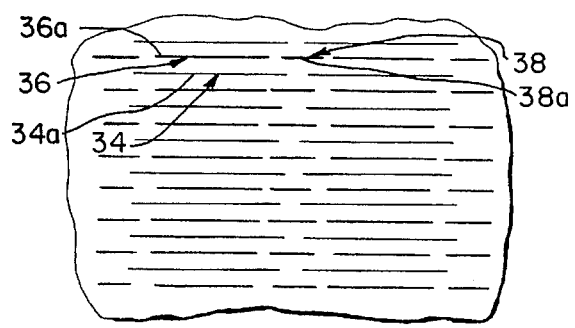
FIG. 1
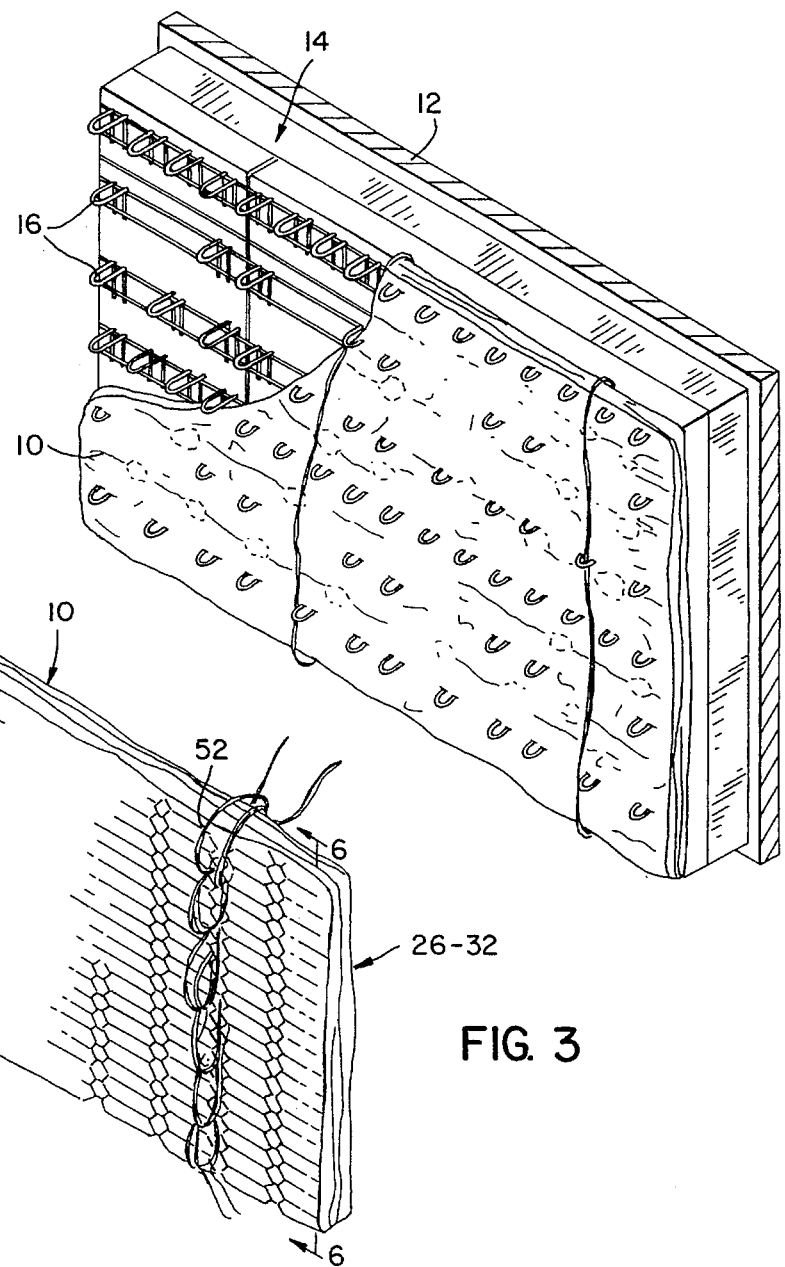
FIG. 2
FIG. 3

PAINT ARRESTOR FORMED FROM SLIT SHEET MATERIAL

FIELD OF THE INVENTION

The present invention generally relates to paint arrestors for trapping and collecting airborne coating overspray which has been discharged from a coating spray gun or other application device and, more particularly, relates to paint arrestors comprised of multiple layers of slit and expanded paper or other media which provide increased paint absorption.

BACKGROUND OF THE INVENTION

The dry filter-type paint spray booth is commonly used throughout the industry for touch-up spraying, batch operations and, in increasing number, as production spray booths. The filter-type booth employs a paint arrestor or filter which is constructed of paper, fiberglass or other materials and is typically mounted in a support module of the type disclosed in U.S. Pat. No. 4,693,048 issued Sep. 15, 1987 to Guetersloh and assigned to the Assignee of this application. Filters are normally 20" by 20" by 1" in size and are raised to form the front wall of an exhaust plenum which includes an exhaust fan designed to draw airborne paint particles into the filter media.

Prior art paint arrestors are comprised of a series of layers of sheet material, each of the layers being slit and expanded to define an array of generally equal sized air spaces distributing columns. Each of the layers when expanded comprises an intersecting grid pattern having runners intersecting at baffles defined by the portion of sheet material disposed between adjacent slits. Inherent to this construction is the fact that on expansion the cross-sectional area of each open air space or cell provides a capture area for a given volume of air flow having a given volume of paint particles entrained therein.

Some paint arrestors contemplate providing a plurality of plies, each parallel to the other, with the axis of the cells of one ply oriented at an oblique angle relative to the medial axis of the filter ply or run housing for defining the cell. This offset construction causes air passing through the filter media to change direction on leaving the family of cells of one ply and entering the adjacent family of cells of the next ply and encourages, thereby, the deposition of the entrained airborne materials onto the surfaces of the cells. Such an arrangement is disclosed in U.S. Pat. No. 5,252,111 issued Oct. 12, 1993 to Spencer et al.

It remains desirable to provide a system of paint arrestors for absorbing paint overspray which offers more surface area for a given product and has the ability to hold an increased amount of paint particles. Such a paint arrestor should be designed to eliminate stretch and sag when the arrestor becomes laden with paint and also to eliminate air gaps around the edges of the paint arrestor when mounted in its support module. Ideally, the paint arrestor should be manufactured with techniques which provide larger paint arrestor pads with less raw stock. It is also highly desirable to provide a paint arrestor with a high affinity to capture paint particles entrained in the fluid flow in the baffles defining the air spaces of the paint arrestor.

SUMMARY OF THE INVENTION

The paint arrestor of the present invention advantageously provides a multi-layer, slit and expanded construction designed to not only attract but trap a high percentage of airborne paint particles discharged from paint application devices. The paint arrestor has a unique construction designed for easy interchangeability, durability and mounting versatility in a support module.

These and other aspects of the invention are realized in a paint arrestor for absorbing paint over-spray comprising a series of layers of sheet material, each of the layers being slit and expanded to define an array of air spaces distributed in columns, the air spaces alternating in size from column to column and repeating in size in every other column. Means are provided for securing the layers in contiguous overlying relationship with one another. The air spaces are generally hexagonal in shape. Each of the layers comprises a flat, generally planar sheet of pliable material having a plurality of parallel, through slits, the slits defining the perimeter of the air spaces when the material is expanded in a direction generally orthogonal to the direction of the slits. Each of the layers when expanded comprises an intersecting grid pattern having runners intersecting baffles defined by the portion of sheet material disposed between adjacent slits, the baffles forming the air spaces. Each of the baffles intersects the plane of the sheet material at an acute angle and the acute angle defines a slope for each of the layers.

In another aspect of the invention, a paint arrestor for absorbing paint overspray comprises a series of layers of sheet material, each of the layers being slit and expanded to define an array of generally hexagonally-shaped air spaces distributed in columns. The air spaces alternate in size between a first predetermined size and a second predetermined size smaller than the first predetermined size and repeat in size in every other column. Means are provided for securing the layers in contiguous, overlying relationship with one another, wherein each of the layers defines an intersecting grid pattern having first runners intersecting with first baffles to define each of the air spaces of the first predetermined size and having first runners intersecting with second baffles to define each of the air spaces of the second predetermined size, the first baffles being formed with elongated slits therein.

In yet another aspect of the invention a paint arrestor for absorbing paint overspray comprises a series of layers of expandable sheet material, each of the layers when unexpanded having an array of slits formed therein and distributed in columns. The slits vary in size between a first predetermined size, a second predetermined size smaller than the first predetermined size and a third predetermined size smaller than the second predetermined size. Means are provided for securing the layers in a contiguous, overlying relationship with one another. The slits of the first and second predetermined sizes alternate within a given column while the slits of the third predetermined size are horizontally aligned with slits of the second predetermined size and are distributed in columns on either side of the slits of the first and second predetermined size. The slits of the first and second predetermined size are parallel to each other in their respective columns as are the slits of the third predetermined size in their columns. The slits of the second predetermined size are located between the slits of the third predetermined size.

BRIEF DESCRIPTION OF THE DRAWINGS

The invention will become better understood by reference to the following detailed description of the preferred exemplary embodiment when read in conjunction with the appended drawing, wherein like numerals denote like elements and;

FIG. 1 is a planar view of one layer of the paint arrestor embodying the present invention in slit and unexpanded form;

FIG. 2 is a perspective view of a portion of a paint spray booth with a support module mounting the paint arrestor thereon;

FIG. 3 is a perspective view of a series of layers of slit and expanded sheet material forming the paint arrestor;

DETAILED DESCRIPTION OF THE PREFERRED EMBODIMENTS

Figure 4:
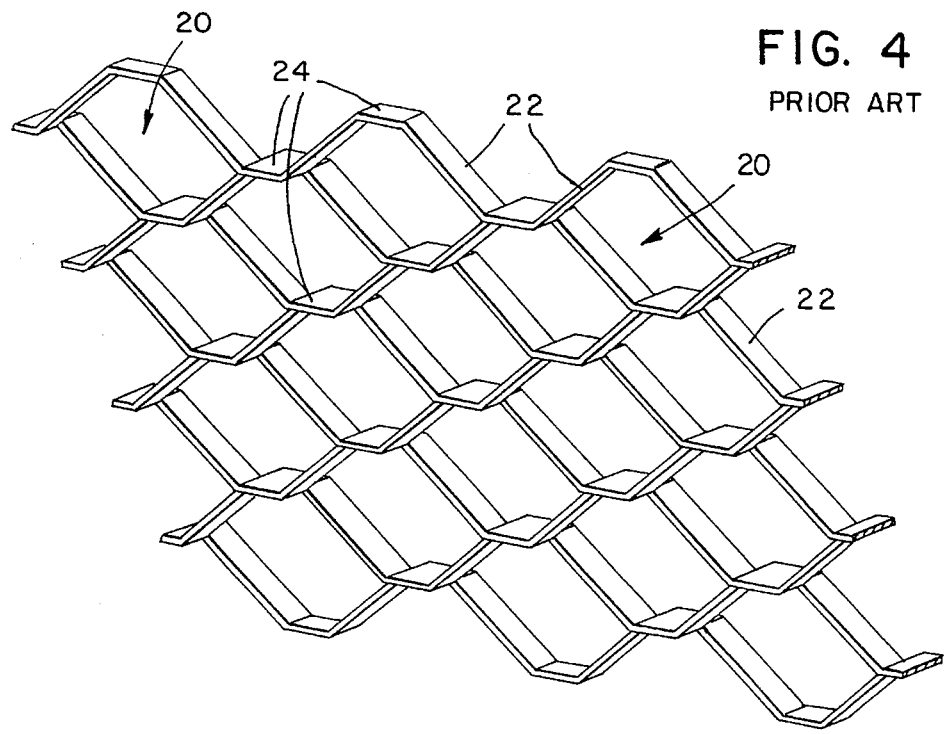
FIG. 4 is a perspective view of a single prior art web slit and expanded to define a paint arrestor.

As best shown in FIGS. 2 and 3 of the drawings, the concepts of the invention are directed to a paint arrestor 10 usable in air treatment apparatus such as a paint spray booth 12. The booth is adapted to ultimately define an enclosure containing the object and spraying equipment (not shown) and air may be caused to flow therethrough and hence to a plenum beneath the booth. A plurality of support modules 14 may be suitably connected to form the booth walls and a plurality of paint arrestors 10 which may be formed of biodegradable, recyclable slit and expanded paper or other filtration construction are mounted via prongs 16 on an exterior face of the support modules 14. In some instances, the support modules 14 include a backup pad (not shown) such that the overspray is prevented from penetrating to the support module elements by the paint arrestors 10.

Referring now to FIG. 4, prior art paint arrestors 10 are comprised of a series of layers 18 of sheet material, each of the layers being slit and expanded to define a grouping of uniformly sized air spaces or cells 20. Each of the layers 18 when expanded comprises an intersecting grid pattern having runners 22 intersecting at baffles 24 defined by the portion of material between adjacent slits. The various runners 22 and baffles 24 are oriented to intersect the general plane of sheet material at an orthogonal angle. The cross-sectional area of each air space or cell 20 provides a capture area for a given amount of air flow in which paint particles are entrained.

Figure 6:
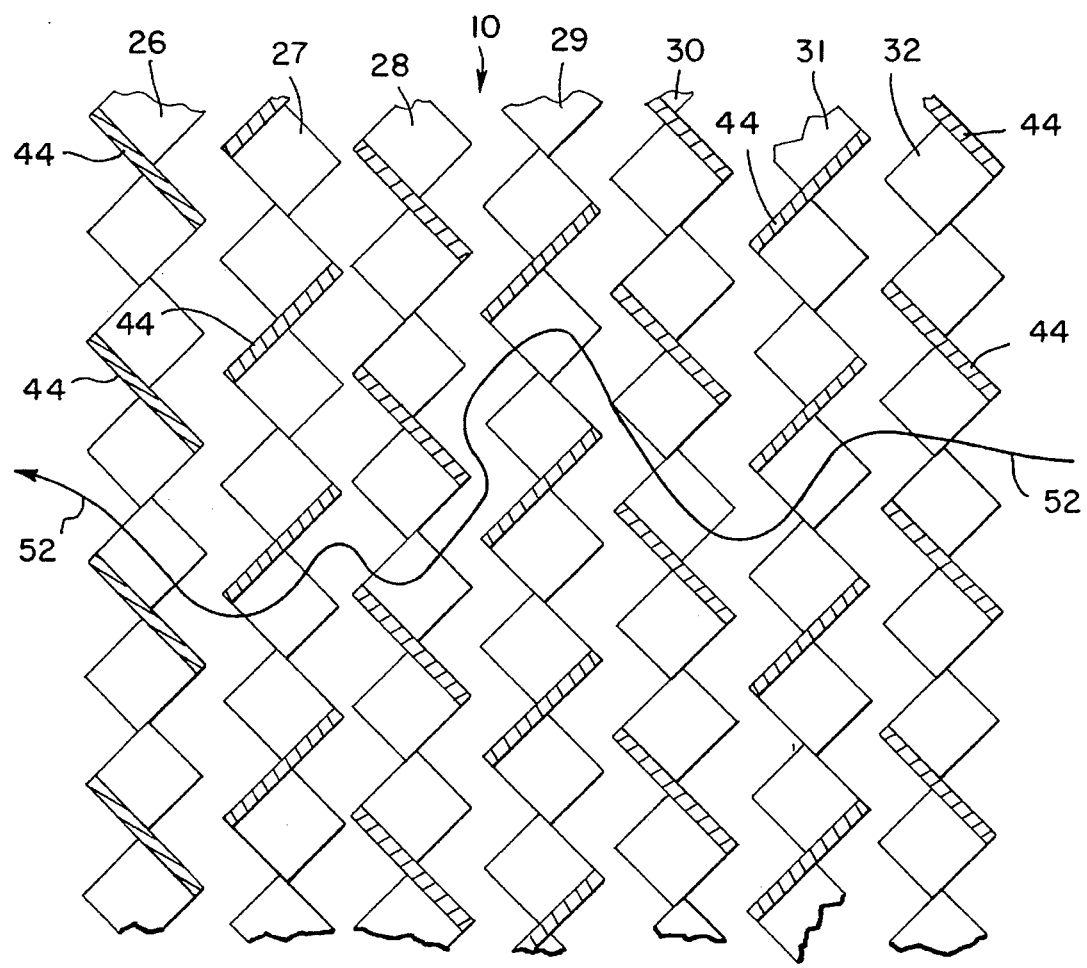
FIG. 6 is a cross-sectional view taken on line 6—6 of FIG. 3.

In the preferred embodiment of the present invention, the paint arrestor comprises a plurality of layers of flat, generally planar expandable sheet material as depicted at 26, 27, 28, 29, 30, 31 and 32 in FIGS. 2, 3 and 6. Each of layers when unexpanded as seen in FIG. 1, has an array of slits 34, 36, 38 formed therein and distributed in columns. Slits vary in size between a first predetermined size 34a, a second predetermined size 36a smaller than the first predetermined size 34a, and a third predetermined size 38a smaller than the second predetermined size 36a. Slits of the first and second predetermined sizes 34a, 36a alternate within a given column while slits of the third predetermined size 38a are horizontally aligned with slits of the second predetermined size 36a and are distributed in columns on either side of the slits of the first and second predetermined sizes 34a, 36a. The slits of the first and second predetermined sizes 34a, 36a are parallel to each other in their respective columns as are the slits of the third predetermined size 38a in their columns. It can also be seen that the slits of the second predetermined size 36a are located between slits of the third predetermined size 38a.

Figure 5:
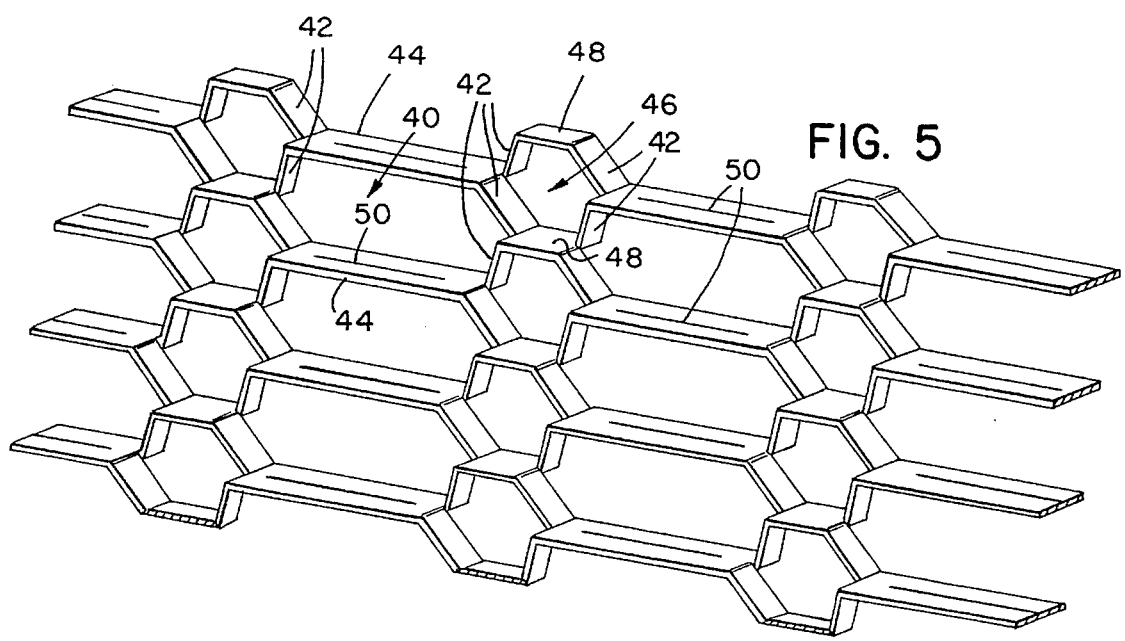
FIG. 5 is a perspective view of a single web slit and expanded to define a paint arrestor of the present invention.

Using the material with the plurality of elongate slits as shown in FIG. 1, each sheet can be expanded in a direction generally orthogonal to the direction of the slits to define the grid pattern shown in FIGS. 3 and 5, wherein each sheet layer 26–32 is expanded to define a plurality of generally hexagonally-shaped air spaces 40 of a first predetermined size in the open center of the grid pattern defined by the slits when expanded. As best shown in FIG. 5, each layer 26–32 is expanded to define four runners 42, each intersecting at a central first baffle 44 to define the perimeter or boundaries of air spaces 40. In like manner, each layer 26–32 also includes a plurality of generally hexagonally-shaped air spaces 46 of a second predetermined size smaller than the first predetermined size, the perimeter of air spaces being defined by four runners 42 intersecting at a central second baffle 48.

As a salient feature of the invention, paint arrestor 10 comprises a plurality of layers of pliable, flexible sheet material with varying sized and spaced slits to provide webs with different grid sizes to maximize the effectiveness of the absorption qualities of the paint arrestor. Further as partially seen in FIG. 6, when each layer is expanded, the various runners 42 and baffles 44, 48 are tilted or oriented to intersect the general plane of the sheet material at a uniform acute angle. In addition, each one of the larger baffles 44 is formed with a horizontal slit 50 so as to rough-up the surface of the baffle. The effect of the angularly-disposed, slitted baffles 44 is to provide a greater surface area for absorbing paint particles in overspray in the paint booth. In the preferred embodiment, the various layers 26–32 are maintained in contiguous overlying relationship with each layer disposed in a positive slope orientation lying next to a negative slope orientation by interweaving a plurality of biodegradable threads 52 through the layers. The construction helps reroute the air along a varying path which also encourages the deposit of airborne paint particles onto the surfaces of the runners and baffles.

In application, it has been found that the paint arrestor of the present invention absorbs 30%–50% more paint than previous paint arrestors. In addition, the construction of the instant paint arrestor prevents problems of stretching and sagging encountered in the prior art and also eliminates air gaps normally present in the mounting of prior paint arrestors in their support modules. From a manufacturing standpoint, cost effectiveness has been improved as each sheet has been found to have a smaller width after being slit and expanded so that larger paint arrestor pads can be produced from less raw stock. Whereas prior art paint arrestors had production problems with stretching and retaining their shape, the present paint arrestor will not stretch and is more controllable during the manufacturing process.

While the invention has been described with reference to a preferred embodiment, those skilled in the art will appreciate that certain substitutions, alterations and omissions may be made without departing from the spirit thereof. Accordingly, the foregoing description is means to be exemplary only, and should not be deemed limitative on the scope of the invention set forth with the following claims.

We claim:

1. A paint arrestor for absorbing paint overspray comprising:

a series of layers of sheet material, each of said layers being slit and expanded to define an array of air spaces distributed in columns, said air spaces alternating in size from column to column and repeating in size in every other column; and means for securing said layers in contiguous, overlying relationship with one another.

2. The paint arrestor according to claim 1, wherein said air spaces are generally hexagonal in shape.

3. The paint arrestor according to claim 1, wherein each of said layers comprises a flat, generally planar sheet of pliable material having a plurality of parallel, through slits, said slits defining the perimeter of said air spaces when said material is expanded in a direction generally orthogonal to the direction of said slits.

4. The paint arrestor according to claim 1, wherein each of said layers, when expanded, comprises an intersecting grid pattern having runners intersecting at baffles defined by the portion of sheet material disposed between adjacent slits, said baffles forming said air spaces.

5. The paint arrestor according to claim 4, wherein each of said baffles intersects the plane of the sheet material at an acute angle.

6. The paint arrestor according to claim 5, wherein the acute angle defines the slope for each of said layers.

7. The paint arrestor of claim 1, wherein each of said layers is comprised of a biodegradable material.

8. The paint arrestor of claim 6, wherein said biodegradable material is recycled paper.

9. The paint arrestor of claim 1, wherein said securing means is a thread woven between said layers.

10. A paint arrestor for absorbing paint overspray comprising:

a series of layers of sheet material, each of said layers being slit and expanded to define an array of generally hexagonally-shaped air spaces distributed in columns, said air spaces alternating in size between a first predetermined size and a second predetermined size smaller than said first predetermined size and repeating in size in every other column; and means for securing said layers in contiguous, overlying relationship with one another, wherein each of said layers defines an intersecting grid pattern having first runners intersecting with first baffles to define each of said air spaces of said first predetermined size and having said first runners intersecting with second baffles to define each of said air spaces of said second predetermined size, said first baffles being formed with elongated slits therein and said first baffles and said second baffles are oriented at a positive slope with respect to the plane of one said layers of sheet material and said first and said second baffles are oriented at a negative slope with respect to the plane of an adjacent one of said layers of sheet material.

11. The paint arrestor of claim 10, wherein said positive and negative slopes alternate in each of said layers of sheet material.

12. A paint arrestor for absorbing paint overspray comprising:

a series of layers of expandable sheet material, each of said layers, when unexpanded, having an array of slits formed therein and distributed in columns, said slits varying in size between a first predetermined size, a second predetermined size smaller than said first predetermined size and a third predetermined size smaller than said second predetermined size, said slits of said first and second predetermined sizes alternate within a given column and said slits of said third predetermined size are horizontally aligned with said slits of said second predetermined size and distributed in said columns on either side of said slits of said first and second predetermined sizes; and means for securing said layers in contiguous, overlying relationship with one another.

13. The paint arrestor according to claim 12, wherein said slits of said first and second predetermined sizes are parallel to each other in their respective columns and said slits of said third predetermined size are parallel to each other in their respective columns.

14. The paint arrestor according to claim 12, wherein said slits of said second predetermined size are located between said slits of said third predetermined size.

* * * * *